Nov. 1, 1949  F. W. SEYBOLD  2,487,031
AUTOMATIC BACK GAUGE SPACER
Filed Jan. 15, 1948  11 Sheets-Sheet 2

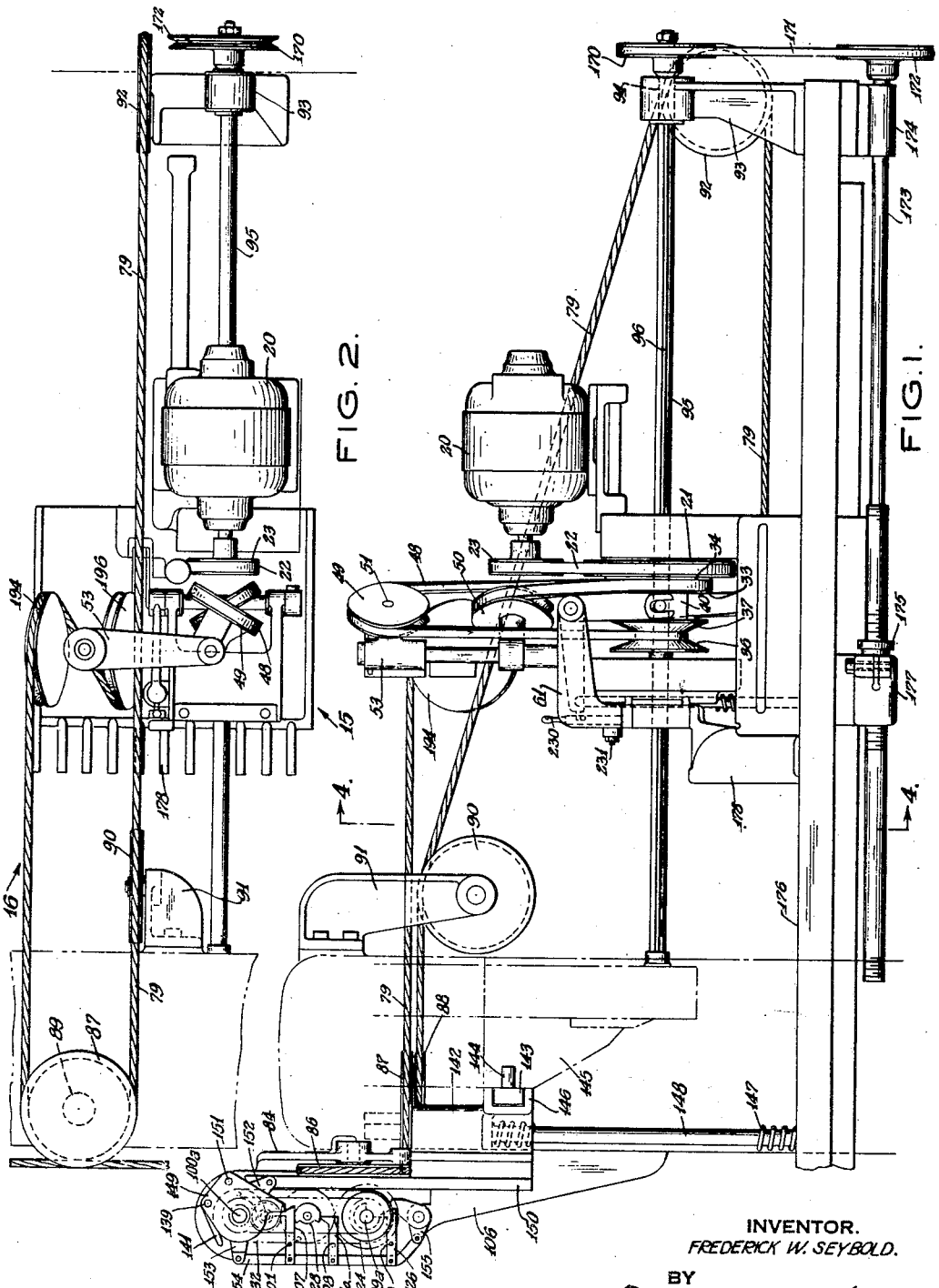
Nov. 1, 1949 — F. W. SEYBOLD — 2,487,031
AUTOMATIC BACK GAUGE SPACER
Filed Jan. 15, 1948 — 11 Sheets-Sheet 1
INVENTOR.
FREDERICK W. SEYBOLD.
BY
Ostrolenk & Faber
ATTORNEYS.

INVENTOR.
FREDERICK W. SEYBOLD.
BY
Ostrolenk + Faber
ATTORNEYS.

INVENTOR.
FREDERICK W. SEYBOLD.
BY
Ostrolenk & Faber
ATTORNEYS.

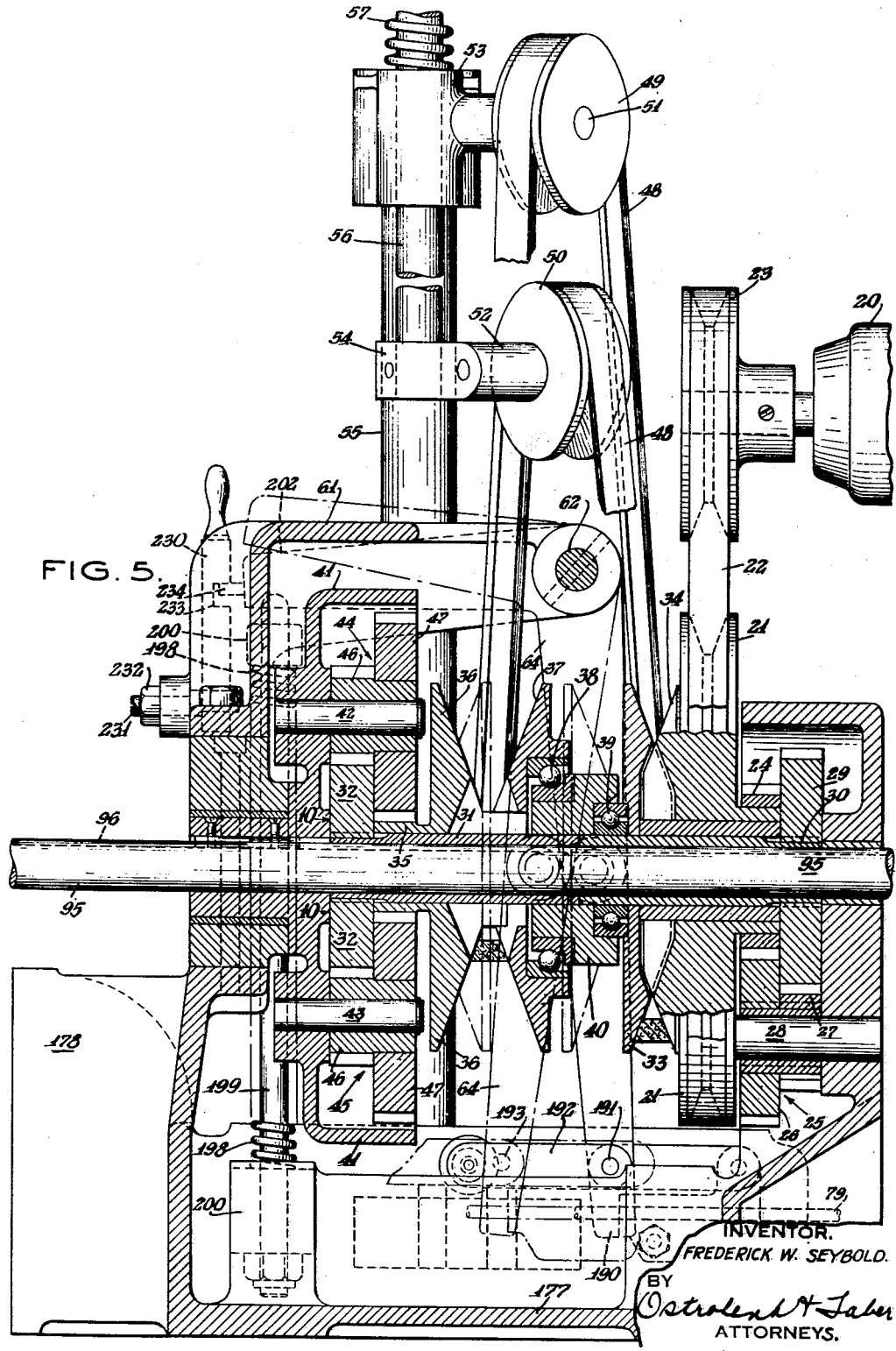

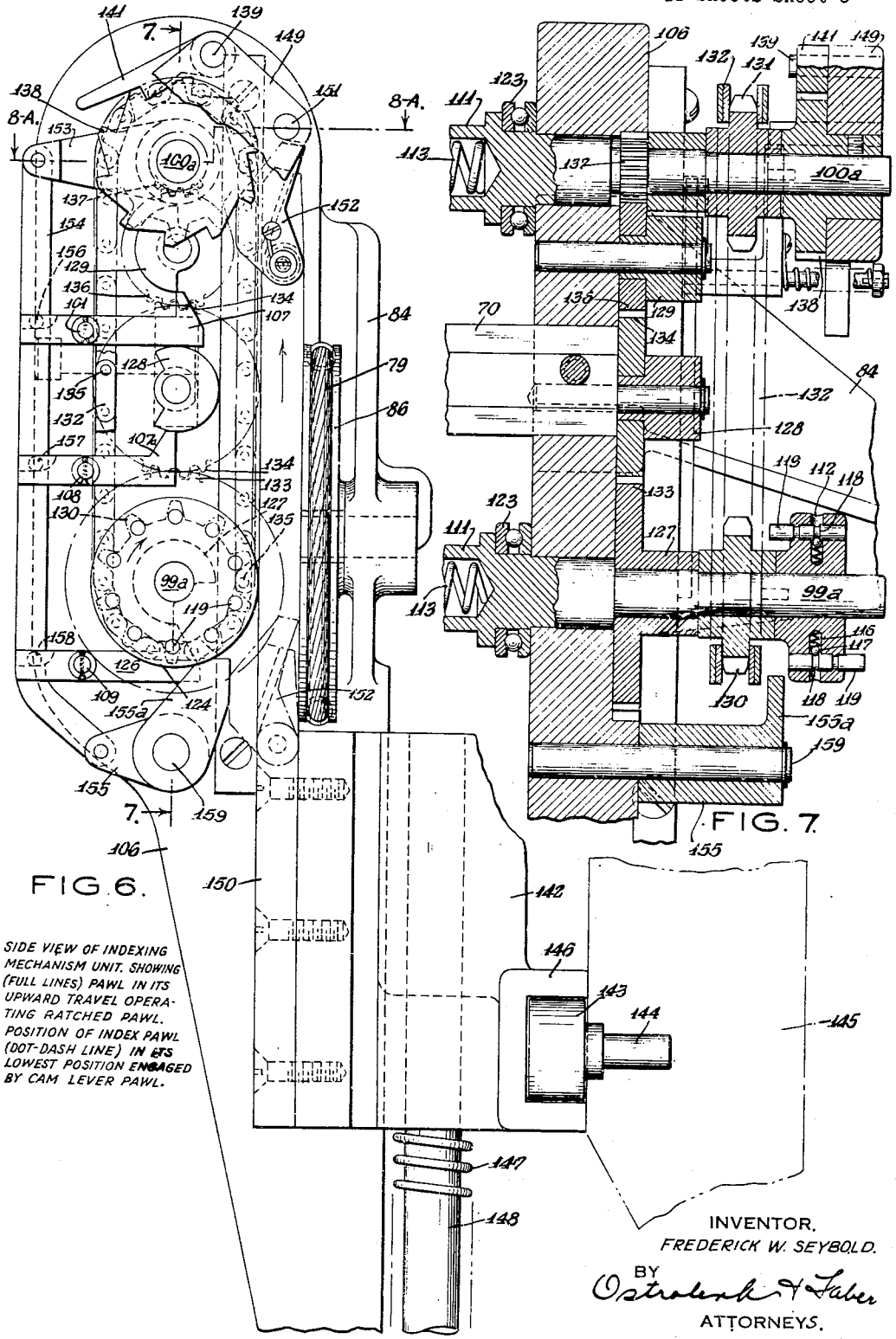

Nov. 1, 1949  F. W. SEYBOLD  2,487,031
AUTOMATIC BACK GAUGE SPACER
Filed Jan. 15, 1948  11 Sheets-Sheet 6
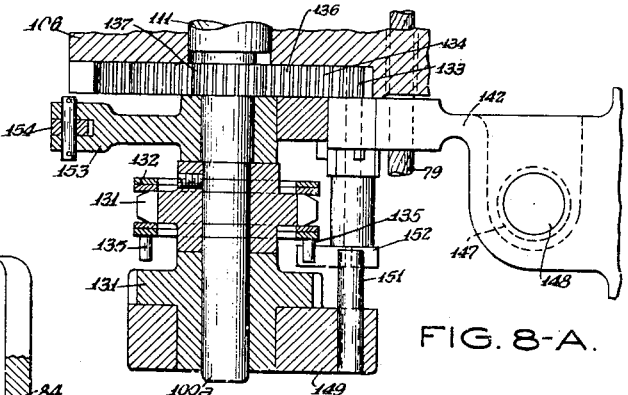
FIG. 8-A.
FIG. 9.
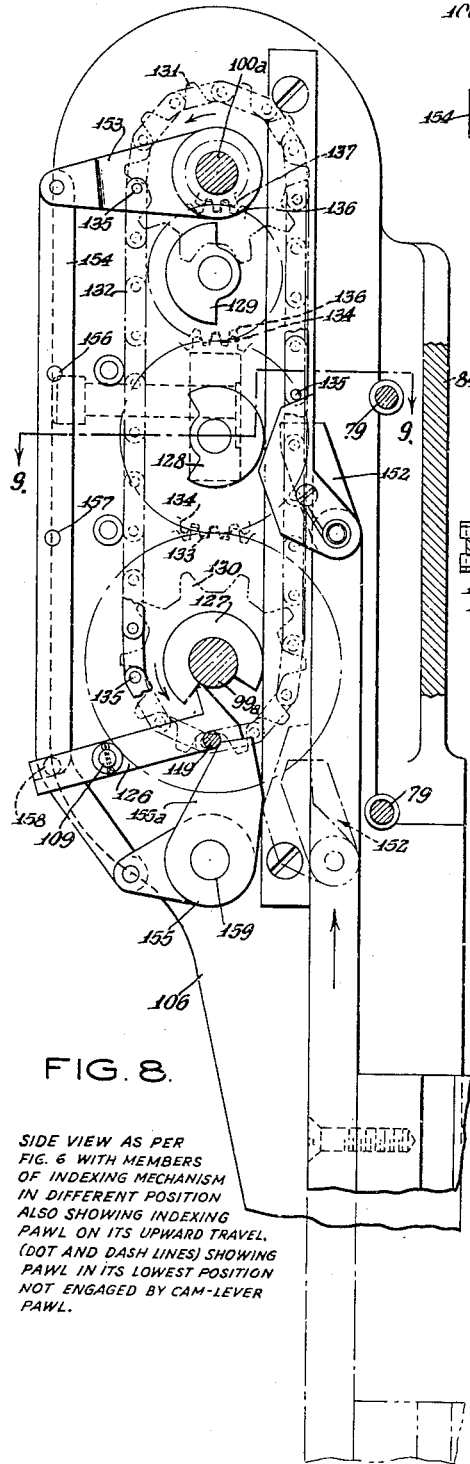
FIG. 8.
SIDE VIEW AS PER
FIG. 6 WITH MEMBERS
OF INDEXING MECHANISM
IN DIFFERENT POSITION
ALSO SHOWING INDEXING
PAWL ON ITS UPWARD TRAVEL.
(DOT AND DASH LINES) SHOWING
PAWL IN ITS LOWEST POSITION
NOT ENGAGED BY CAM-LEVER
PAWL.
FIG. 10.
INVENTOR.
FREDERICK W. SEYBOLD.
BY
Ostrolenk & Faber
ATTORNEYS.

Nov. 1, 1949  F. W. SEYBOLD  2,487,031
AUTOMATIC BACK GAUGE SPACER
Filed Jan. 15, 1948  11 Sheets-Sheet 7
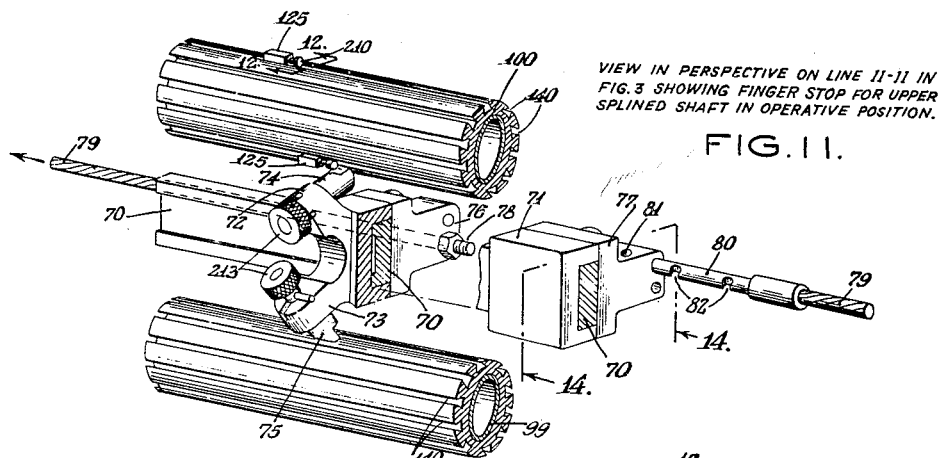
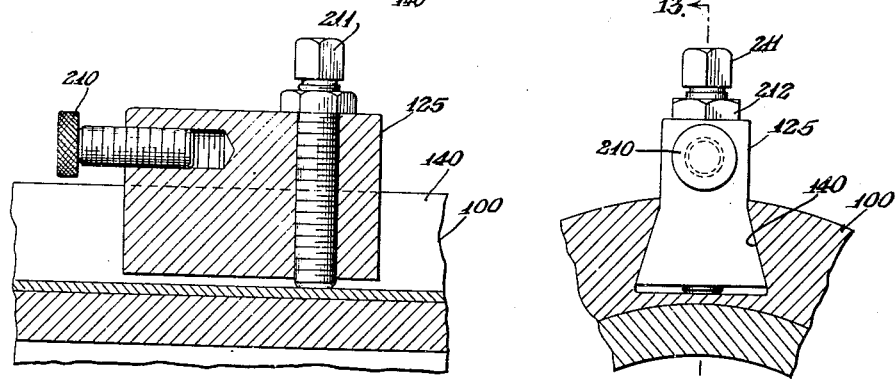
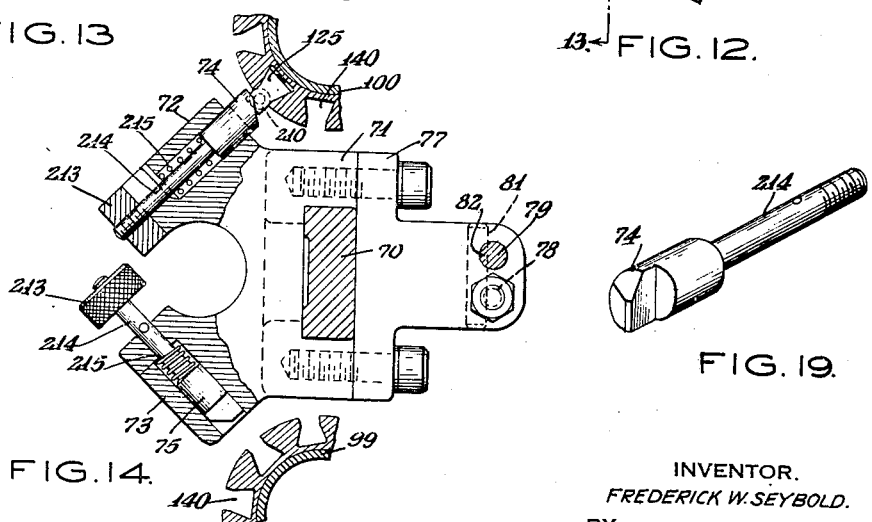
INVENTOR.
FREDERICK W. SEYBOLD.
BY
Ostrolenk & Faber
ATTORNEYS.

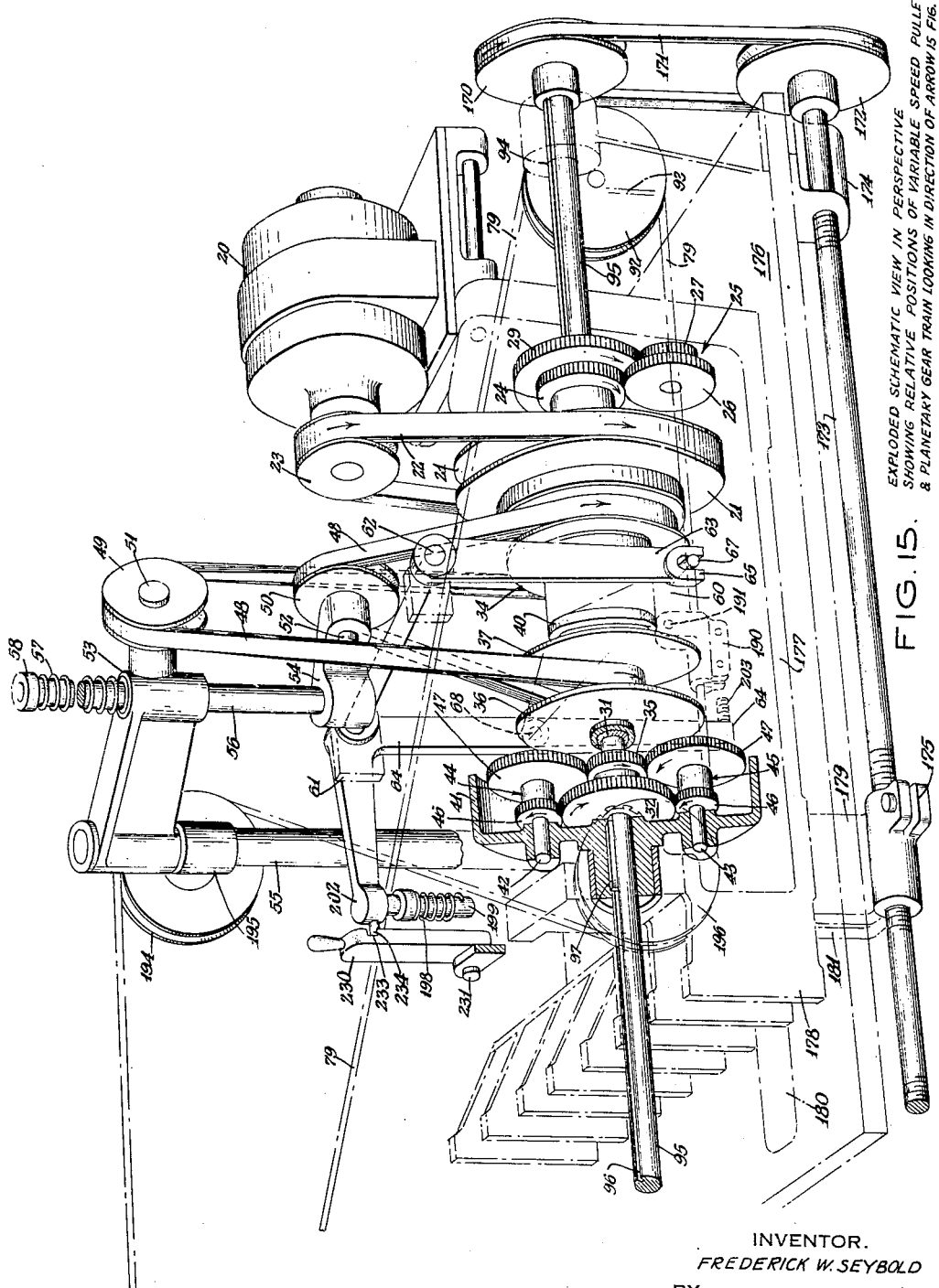

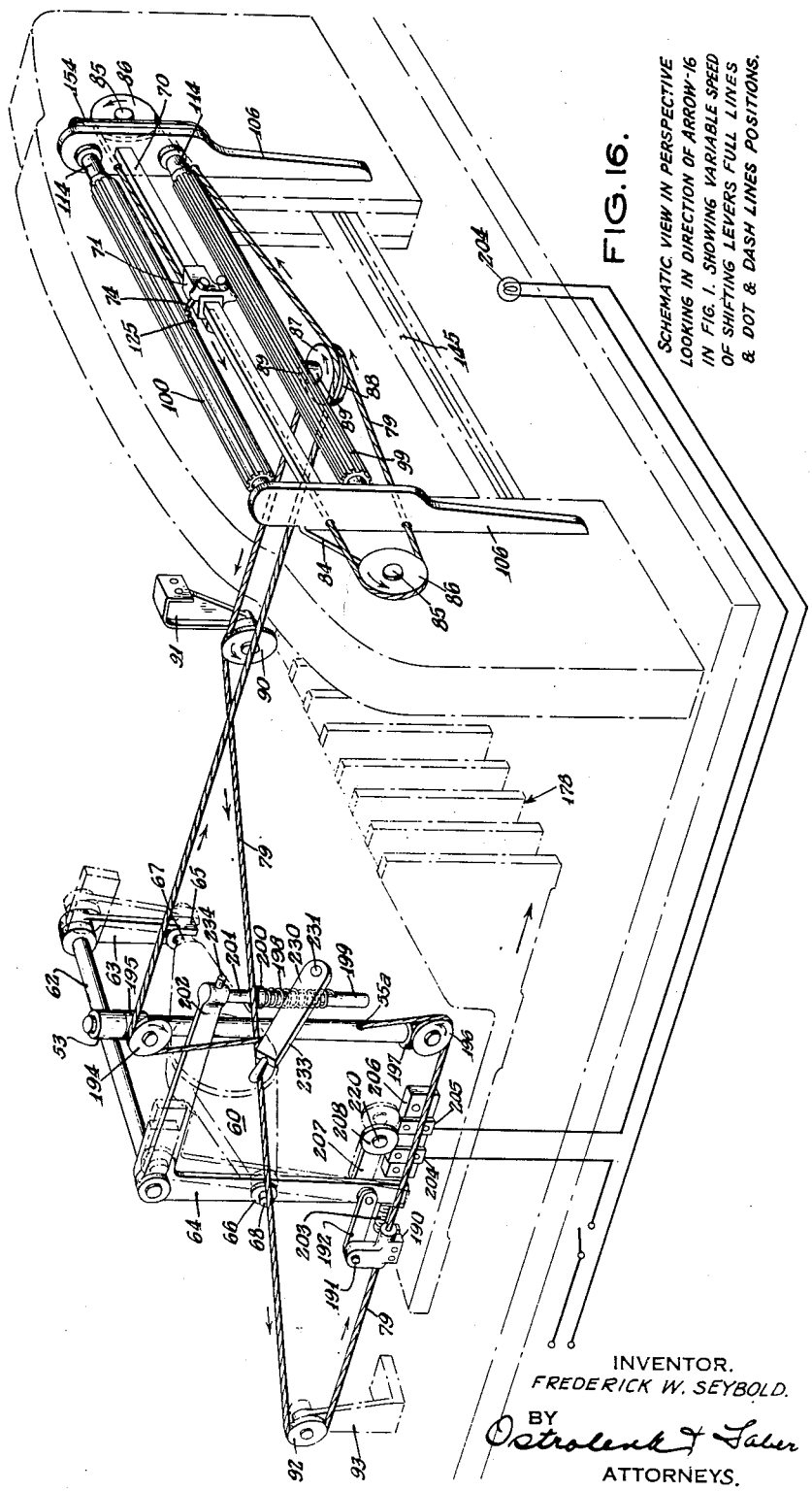

Nov. 1, 1949  F. W. SEYBOLD  2,487,031
AUTOMATIC BACK GAUGE SPACER
Filed Jan. 15, 1948  11 Sheets—Sheet 10
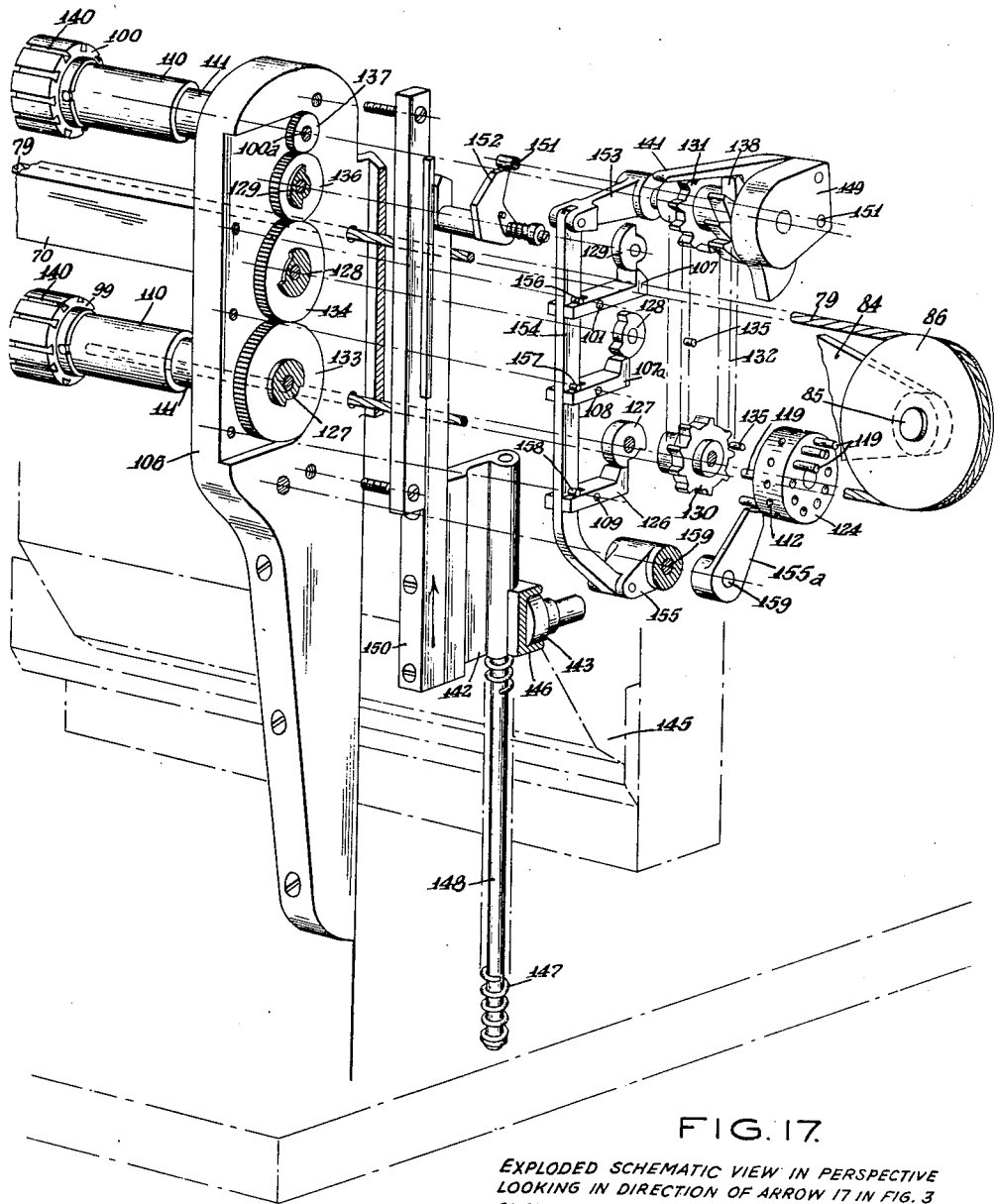
FIG. 17.
EXPLODED SCHEMATIC VIEW IN PERSPECTIVE
LOOKING IN DIRECTION OF ARROW 17 IN FIG. 3
SHOWING RELATIVE LOCATION OF PARTS OF
AUTOMATIC INDEXING MECHANISM WITH KNIFE
STROKE IN UPWARD DIRECTION
INVENTOR.
FREDERICK W. SEYBOLD.
BY Ostrolenk & Faber
ATTORNEYS.
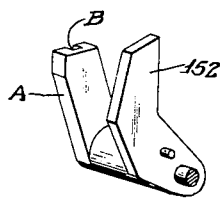
FIG. 18
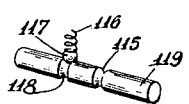
FIG. 17-A Nov. 1, 1949     F. W. SEYBOLD     2,487,031
AUTOMATIC BACK GAUGE SPACER
Filed Jan. 15, 1948     11 Sheets-Sheet 11

INVENTOR.
FREDERICK W. SEYBOLD
BY
Ostrolenk & Faber
ATTORNEYS

Patented Nov. 1, 1949

2,487,031

UNITED STATES PATENT OFFICE 2,487,031

AUTOMATIC BACK GAUGE SPACER

Frederick W. Seybold, Westfield, N. J., assignor to E. P. Lawson Co., Inc., New York, N. Y., a corporation of New York Application January 15, 1948, Serial No. 2,347

40 Claims. (Cl. 164—59)

My present invention relates to automatic spacing mechanism and more particularly to an automatic spacing mechanism specifically designed for use in connection with guillotine type paper cutters.

In the operation of guillotine type paper cutters, a pile of paper is placed on the work table beneath the cutting knife. The back gauge usually provided on the work table is then adjusted so that the portion of the pile which it is desired to cut off extends forward of the cutting knife edge so that when the knife is brought down, it will cut off an exactly dimensioned section of the pile.

In operating paper cutters of this type, therefore, it frequently becomes necessary to adjust the back gauge many times for different cuts which are to be made. Even if a plurality of regular cuts is to be made from a single pile, the back gauge must be moved up each time in order to ensure that the edges are perfectly squared so that the exact cut may be made.

The object of my invention is the provision of a novel automatic back gauge spacing mechanism which will adjust the back gauge at successive individually predetermined intervals after successive cuts.

By the use of my invention, therefore, the operator need do nothing more than place the initial pile of paper on the machine against the back gauge and then operate the paper cutter so that the knife moves up and down a desired number of times to cut the desired number of piles.

The back gauge automatic spacing mechanism automatically moves the back gauge the proper distance at the end of each cut and before the next cut is started.

Automatic operation or spacing of the back gauge is already known as shown in the prior Patent No. 2,053,499.

My invention is directed specifically to simplified presetting mechanism which will operate repetitively through the same cycle until the presetting mechanism has been readjusted.

My invention is also directed to novel operating means for the back gauge which will bring the back gauge into movement promptly at the completion of a cutting cycle, move the back gauge rapidly to the next selected position and then decelerate the back gauge gradually to its next adjusted position, the gradual deceleration of the back gauge preventing overshooting of the predetermined mark.

For presetting purposes, my invention includes revolving presetting bars located at the front of the machine, each provided with a plurality of grooves in which stop pins may be slidably adjusted longitudinally of the bars.

Preferably, I provide two such longitudinal bars at the front of the machine, each of the longitudinal revolving bars having ten equally spaced longitudinal grooves. The stop pins are longitudinally adjustable in each of the grooves.

A stop member mounted on a cable connected to the back gauge operating mechanism and movable along a line parallel to the bars successively engages the preset stop pins in the bars. When the stop member engages a stop pin, the back gauge adjusting mechanism is brought to a halt, and the back gauge is set for its next adjustment.

On the completion of a cut, the stop bars are rotated $\frac{1}{10}$ of a revolution to bring the next groove in each bar into line with the stop member. This pulls the stop pin out of engagement with the stop member, and the stop member is free to move simultaneously with the movement of the back gauge to a position where the stop member engages the next stop pin in the adjacent groove which has been rotated to stopping position, at which time the mechanism for operating the back gauge is again brought to a halt.

My invention is thus directed to novel stop members for controlling successive positions of the back gauge; novel indexing elements for moving stop members successively into position; and novel mechanical operating elements responsive to the operation of the knife to move the back gauge under the control of the stop members and the indexing elements in such a manner that the back gauge will always be accurately positioned.

Thus, an object of my invention is the provision of novel automatic back gauge stepping means for moving the back gauge to a number of predetermined positions.

Another object of my invention is the provision of novel revolving stop bars at the front of the machine by means of which all of the successive positions which the back gauge is to assume may be pre-set by the operator at the front of the machine.

Another object of my invention is the provision of novel indexing apparatus for controlling successive positions of the stop bars and hence successive positions of the back gauge.

Another object of my invention is the provision of mechanical operating means for moving my back gauge under the control of the stop bars and indexing elements so that the back gauge will move accurately to the predetermined position.

Another object of my invention is the provision of novel speed control means for the operating mechanism of my novel back gauge to cause the same to move the back gauge rapidly between intervals but to bring it to a slow stop so that it will not overshoot the predetermined setting.

The foregoing and many other objects of my invention will become apparent in the following description and drawings in which:

Figure 1 is a side view of a cutting knife embodying my novel spacer mechanism and the operating, indexing, and control elements thereof.

Figure 2 is a top view of the unit of Figure 1.

Figure 5 is a cross-sectional view of the operating elements of my novel spacer mechanism taken on line 5—5 of Figure 4 looking in the direction of the arrows.

Figure 6 is an enlarged side view of the control and indexing elements of my novel spacer mechanism, the said view being an enlargement of the upper left portion of Figure 1.

Figure 7 is a cross-sectional view of a portion of the index and control elements of my novel spacer mechanism taken on line 7—7 of Figure 6 looking in the direction of the arrows.

Figure 8 is a view corresponding to that of Figure 6 showing another position of the index and control elements.

Figure 8A is a cross-sectional view through a portion of the index and control elements of my novel spacer mechanism taken on line 8A—8A of Figure 6 looking in the direction of the arrows.

Figure 9 is a cross-sectional view through a portion of the index and control elements of my novel spacer mechanism taken on line 9—9 of Figure 8 looking in the direction of the arrows.

Figure 10 is a cross-sectional view through the main operating shaft of the operating elements of my novel spacer mechanism taken on line 10—10 of Figure 5 looking in the direction of the arrows.

Figure 11 is a perspective view partly in cross-section through the splined indexing shafts or bars of the control section of my novel spacing mechanism taken on line 11—11 of Figure 3 looking in the direction of the arrows.

Figure 12 is an elevation partly in cross-section of the stop mounting for the control elements of Figure 11 taken on line 12—12 of Figure 11 looking in the direction of the arrows.

Figure 13 is a cross-sectional view taken on line 13—13 of Figure 12 looking in the direction of the arrows.

Figure 14 is a cross-sectional view of the stopping element for cooperating with the stops on the splined shafts taken on line 14—14 of Figure 11 looking in the direction of the arrows.

Figure 15 is an expanded view in perspective of the operating elements of Figure 5.

Figure 16 is a schematic view in perspective showing the positions of the speed shifting levers.

Figure 17 is an expanded view in perspective of the indexing mechanism of Figure 8.

Figure 17a is a view in perspective of one of the indexing pins of Figure 17.

Figure 18 is a view in perspective of the pawl of Figure 17.

Figure 19 (on Sheet 7) is a view in perspective of one of the stop pins.

Figure 3:
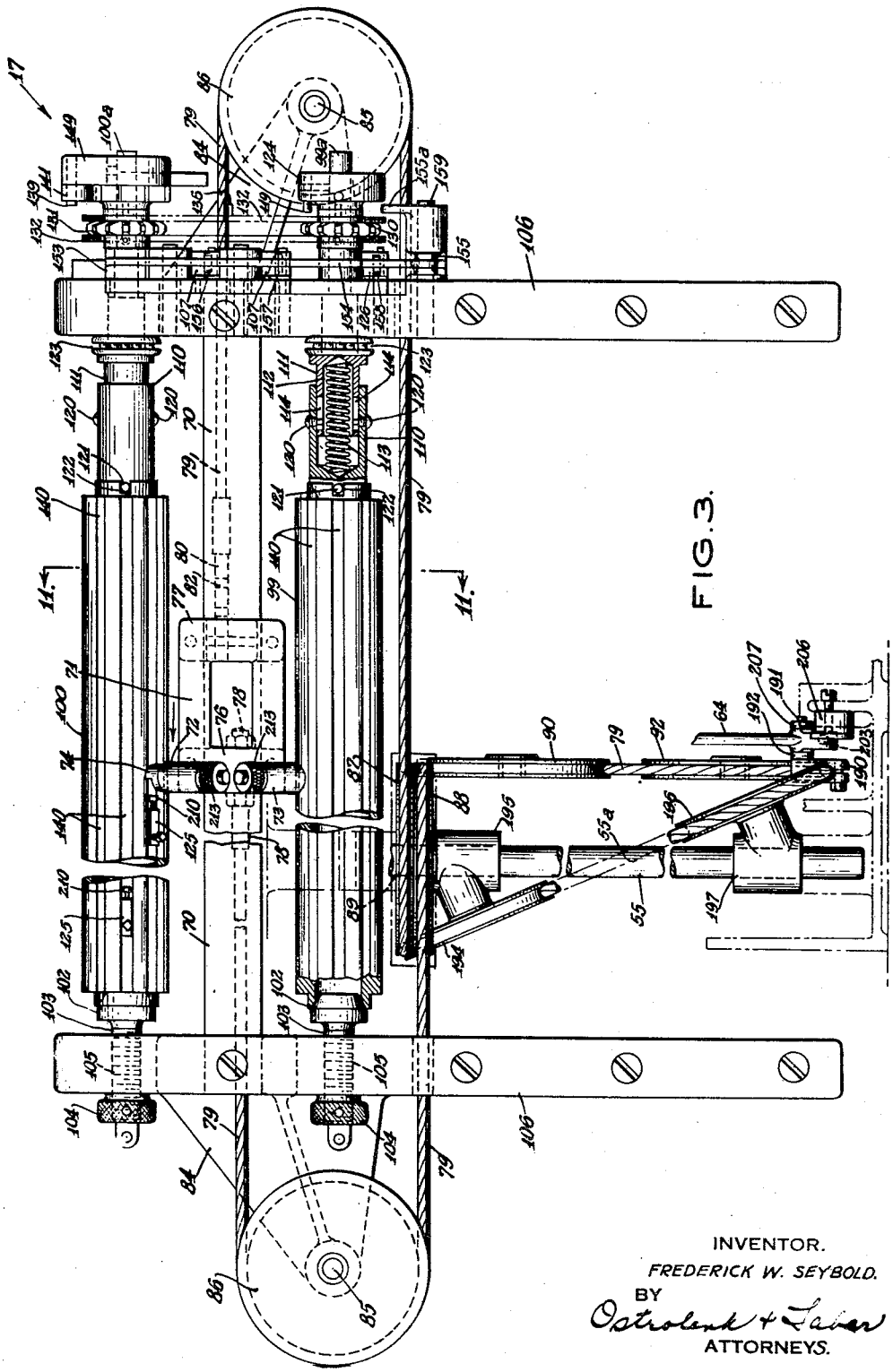
Figure 3 is a front view of the control or indexing elements for my novel spacer mechanism.
Figure 4:
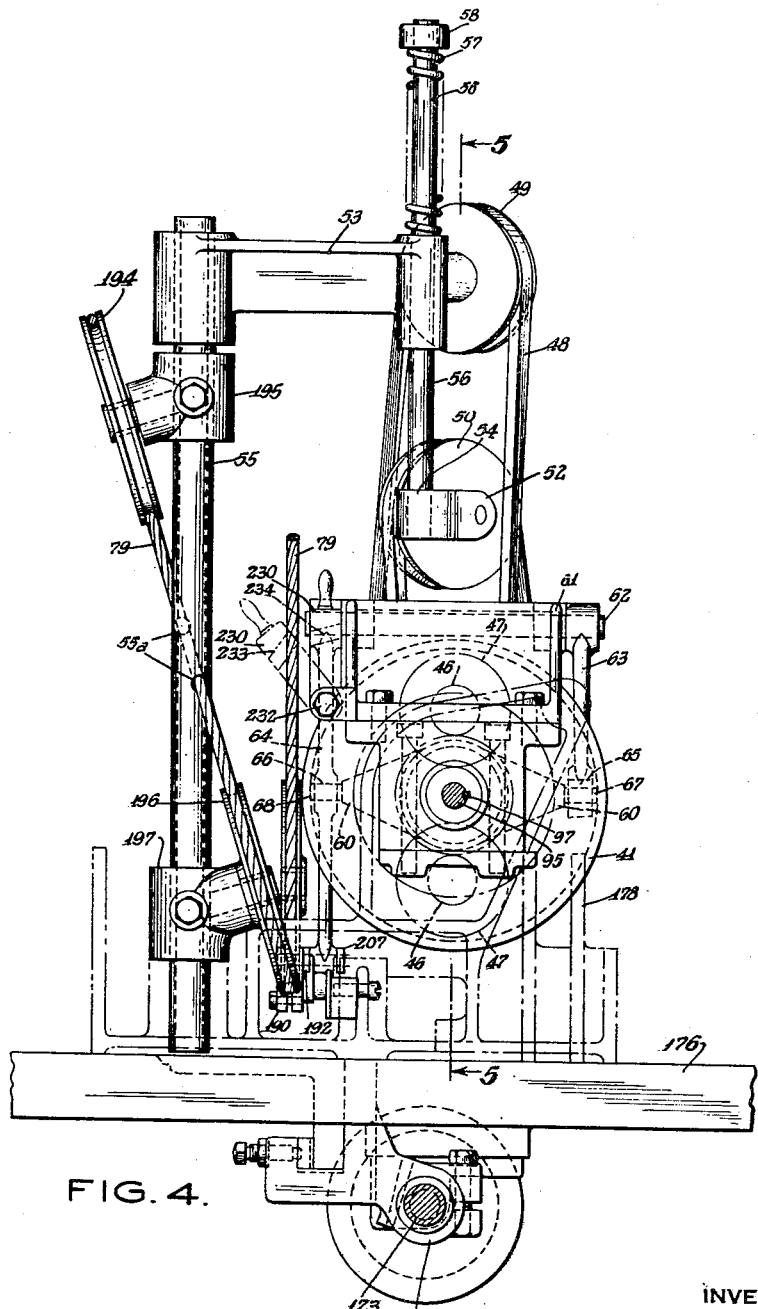
Figure 4 is an end view partly in cross-section taken on line 4—4 of Figure 1 looking in the direction of the arrows and showing the operating elements of my novel spacer mechanism.

In the following figures, the stop bars and their operation will be more clearly understood from Figures 3, 11 to 14 and 16; the indexing mechanism will be more clearly understood from Figures 1, 3, 6, 7, 8 and especially Figure 17; the operating elements including the speed shifting means will be more readily understood from Figures 1, 2, 4, 5 and especially Figures 15 and 16.

Reference is first made to Figures 3, 11 to 14, and 16.

The two stop bars 99 and 100 are spaced apart vertically but are parallel to each other. On each of the shaft extensions 99a and 100a is fastened a sprocket 130, 131. An endless chain 132 connects the two sprockets 130 and 131 (see Figures 3, 6 to 9). This endless chain is composed of thirty links and a pin 135 (Figure 17) protrudes from the tenth, the twentieth, and the thirtieth links. Protruding pins 135 are used for indexing or returning the stop bars 99 and 100 to their original position after all of the stops 125 on the stop bar have been contacted. In other words, assuming that it takes thirty-seven knife strokes to completely cut up a given pile of paper and as there are ten splines 140 in each of the stop bars 99 and 100, each stop bar would have made 3.7 revolutions; in order thereafter to return the stop bars to their original position for making a first cut on a second pile of paper identical with the first pile of paper, it will be necessary to turn the stop bars 99 and 100 through an additional $\frac{3}{10}$ of a revolution so that the first stop block 125 will be in line to stop the back gauge for the first knife stroke.

In order to accomplish this .3 additional revolution of the stop bars 99 and 100 at the completion of the thirty-seven cuts taken as an example, a series of cams and gearing is provided. The stop bars 99 and 100 which are provided with ten splines 140 each are each indexed $\frac{1}{10}$ of a revolution after each knife stroke to bring the next stop 125 into its proper position to stop the back gauge. This indexing movement is accomplished as follows:

Stop bars 99 and 100 are rotatably mounted at the left end on the cone-shaped spindle 102 of adjustable screws 103 which can be locked in adjusted position by the knurled nuts 104. The screws 104 are mounted in threaded bores 105, 105 in the brackets 106 which are fastened to the housings of the paper cutting machine. On the right hand side, stop bars 99 and 100 are each mounted on a retractable cone sleeve 110. Cone sleeves 110 are hollow and fit over the shafts 111, 111, the latter having a counterbore or recess 112 to receive the compression spring 113.

Longitudinal slots 114 diametrically opposite in each shaft 111 receive the cylindrical ends of screws 120 which limits the movement of the conical sleeves 110 to the left. A pin 121 passes perpendicularly through the sleeve 110 near its left-hand end, said pin being used to register with a slot 122 in each stop bar 99 and 100. Pin 121, therefore, is the driving member to rotate the stop bar 99 and 100.

A thrust bearing 123 which is mounted on the shaft 111 takes the thrust which is caused by the compression spring 113 bearing against this conical sleeve 110 and the shaft 111, said thrust being taken by the bracket 106. The conical screw 103 being adjustable permits the adjustment for lateral displacement of the stop bar 99 or 100 so that after a series of stops 125 (Figures 3, 11 to 14) have been set up on the bars 99 and 100 and it should be found desirable that the entire set-up should be shifted either to the right or the left, this can be done by merely adjusting the screw 103 of each bar 99 and 100 and locking it in place thereafter by means of the lock nut 104.

A cross head 142 is reciprocated by a roller 143 which is carried on a stud 144 mounted on the knife bar casting 145 (Figures 6 and 17). Roller 143 rides in channel 146 secured to cross-head 142. Cross head 142 is urged in the upward direction by the compression spring 147 which fits loosely over the stationary shaft 148. On the cross head 142 is mounted the push bar 150 on the upper end of which is mounted the pawl 152 which may contact the pin 151 on the pawl lever 149, said lever being fulcrummed on the upper shaft 111. The additional pawl lever 141 is mounted on a pin 139 on the pawl lever 149 so that when the cross head 142 makes its upward movement, the pawl 152 will contact the pin 151 and rock the pawl lever 149 in a counterclockwise direction. Then the pawl 141 which engages the ratchet 138 which is also fulcrummed on the upper shaft 111, the ratchet 138 being fastened to the upper shaft 111 will, therefore, turn the stop shafts 99 and 100 1/10 of a revolution every time that the knife bar casting 145 makes a downward and an upward movement.

The pawl lever 149 will turn in a clockwise direction by gravity whenever the crosshead 142 makes a downward stroke. I have given the example of thirty-seven cuts to completely cut up a given pile of paper which would require some mechanism operative after the thirty-seventh cut or while the thirty-seventh cut is being made to return the stop bars 100 and 99 to their original position. In order to accomplish this, the following mechanism is provided:

On the upper shaft 111 is mounted a small pinion 137 having sixteen teeth, and this pinion meshes with a pinion 136 having thirty-two teeth, and this latter pinion meshes with a gear 134 having forty-eight teeth, and this pinion meshes with a gear 133 having sixty-four teeth. Cam 129 on thirty-two tooth gear 136 extends over 180°; cam 128 on forty-eight tooth pinion 134 extends over 240°; cam 127 on sixty-four tooth gear 133 extends over 270°.

In other words, cam 129 attached to the thirty-two tooth pinion 136 has a gap of 180°, whereas the cam 128 attached to the forty-eight tooth pinion 134 has a gap of 120°, and the cam 127 attached to the sixty-four tooth pinion 133 has a gap of 90°. Now since we have used thirty-seven cuts as an example, we would use the cam 127 attached to the sixty-four tooth pinion 133.

For each index movement of the stop 99 and 100, these shafts will have made .1 revolution or 3.7 revolutions for thirty-seven cuts. Since the drive ratio between gear 137 on stop shaft 100 and gear 133 is four to one, cam 127 will have rotated ¾ of a revolution during the first three revolutions of gear 137 which resulted from thirty cuts and .7 of the remaining quarter of a revolution during the remaining .7 of a revolution of gear 137 resulting from the last seven cuts.

The circular cam 127 which is fastened to the sixty-four tooth pinion 133 is contacted by a lever 126 on pin 109 which during the first thirty indexing movements (the first three revolutions of gear 137 and the first ¾ revolution of gear 133) will have been in contact with the circular portion of the cam 127 on the sixty-four tooth pinion 133; but beginning with the thirty-first knife stroke, the lever 126 may drop into the gap which extends for 90° on the cam 127 on the sixty-four tooth gear 133.

On the lower shaft 11 near its extremity is fastened the small drum 124 (Figure 17) and this drum is provided with ten slidable index pins 119. These pins have a circular groove 118 in the middle, said groove serving for a ball 117 under spring pressure from the spring 116 whereby these pins 119 can be pushed inwardly and held in place by the ball 117. A second groove 115 on the pin 119 similarly serves for the purpose of holding said pin in its extended position. Springs 116 and balls 117 are positioned by the radial bores 112 in drum 124.

When thirty-seven cuts are to be made, six pins 119 will be set by the operator in their protruding position, and the seventh, eighth, ninth, and tenth pins 119 will be in their retracted position. The lever 126 is pivoted on a pin 109 in the bracket 106 to engage cam 128. Lever 107 is pivoted on pin 101 in bracket 106 to contact cam 129. Lever 153 is pivoted on extension 100a of the upper shaft. The outer forked end of lever 153 carries the upper end of the vertical flat bar 154. A pawl 155 is pivoted on a pin 159 also fast in the bracket 106, and one end of this pawl is connected to the flat bar 154.

The vertical flat bar 154 carries three pins 156, 157, 158 about equally spaced; these pins are in cooperating relation, respectively, with the three levers 107, 107a, 126. The arm 155a of pawl 155 is contacted by the pins 119; and the flat bar 154 is prevented from dropping vertically by these pins 119, but when the stop bars 99 and 100 are indexed for the thirty-seventh time and as previously stated pin #7 of the pins 119 in the drum 124 is in its retracted position, the pawl 155 will now permit the flat bar 154 on the lever 153 to drop, whereby the lever 126 can now drop into the gap of the cam 127 on the sixty-four tooth pinion 133 and when this occurs, the pawl 155 will then turn out of engagement or will turn counterclockwise a sufficient amount so that the pawl 152 will contact the extending pin from the chain 132.

In other words, after the thirty-sixth cut has been made, the pin extending from the chain will be six pitches from its starting position, and then the pawl 152 comes in contact during the thirty-seventh up stroke of the cross head 142 with that extended pin on the chain and will then move the chain forward the remaining four pitches to bring the stop bar back to its original position.

In a similar manner, let us assume now that thirteen cuts will complete all of the cutting operations on a given pile of paper. I would then use the first cam 129 on the thirty-two tooth pinion 136 and push out only two pins 119 on the drum 124 whereupon after the tenth knife stroke, the cam 129 on the thirty-two tooth pinion 136 would permit the pin 156 on bar 154 held up by lever 107 to drop provided the pawl 155 were not held out by one of the pins 119 protruding from the drum 124, but since only two of such pins 119 are protruding, then on the thirteenth reciprocation of the cross head 142, the pawl 155 can turn counterclockwise and the flat bar 154 can now drop because the lever 107 is now in the gap of the cam 129 on the thirty-two tooth pinion 136 and thereby the pawl 152 can also turn counterclockwise so that its pushing end will be directly underneath the extended pin 135 on the chain 132. When the cross head 142 makes its thirteenth upward stroke, the pawl 152 will contact said protruding pin 135 on the chain 132 and will in this case move it up eight pitches whereby it will return the stop bars 99 and 100 to their original position.

Assume now that we have twenty-five cuts to make in order to completely cut up a given pile of paper stock. I would then use the cam 128 on the forty-eight tooth pinion 134 and use the lever 107a, and we would have four pins 119 protruding from the drum 124 so that after the twentieth knife stroke, the lever 107a will be permitted to drop in the gap of the cam 128 on the forty-eight tooth pinion 134 and whenever the pawl 155 is permitted to turn in a counterclockwise direction due to the absence of the fifth pin 119 which is in its retracted position on the drum 124, which will then also permit the counterclockwise turning of the pawl 152, and this will bring the end of said pawl 152 directly underneath the protruding pin 135 on the cha. 132.

Near the completion of the twenty-fifth knife stroke, the upward movement of the cross head 142 will move the chain six pitches and, therefore, return the stop bars 99 and 100 to their original starting position for a second identical pile as previously cut up. Cams 129, 128 and 127 may be made readily removable so that the appropriate cam may be used. No cam is used for any pile up to ten; cam 129 is used for piles up to twenty; cam 128 is used for piles up to thirty; cam 127 is used for piles up to forty. Cams 129 and 128 may remain in position when cam 127 is used; but cams 127 and 128 must be removed to permit the use of cam 129. In the alternative, pins 156, 157, and 158 may be made removable or levers 107, 107a and 126 may be made removable.

The pawl 152 as previously described may be in a first angular position where it contacts the pin 151 on the pawl lever 149 during the up stroke of the cross-head 142, or in a second angular position where it will contact one of the extended pins of the chain 132 during the up stroke of the cross-head 142.

A guide 150 is fastened to the right hand bracket 106 and the narrow strip on said guide will be against the face A of the pawl 152 when it is in the first angular position, and the narrow strip of the guide 150 will run in the groove B of the pawl 152 when it is in the second angular position (Figures 17 and 18).

If, for any reason, the operator wishes to disconnect the indexing of the stop bars 99 and 100, he will lift the pawl 152 out of engagement with the ratchet wheel 138 and then it will not index on the upward or return stroke of crosshead 142. The knife may then simply go up and down without indexing the back gauge.

*Power mechanism for actuating the back gauge*

The motive power for moving the back gauge forward is derived from a constantly rotating motor 20. This motor drives at constant speed one member of a three-element planetary gear train, while a second element of the planetary gear train is driven at a minimum speed and will have this speed increased by 100%; the third element is the planetary gear carrier.

When the second element, i. e., gear 35 rotates at its minimum speed, the planetary gear carrier will be rotating at its highest speed and when the second element has its speed increased to a certain maximum, it will result in bringing the speed of the planetary gear carrier down to zero. This speed variation of the second element of the planetary transmission is accomplished by varying the diameter of the two interlocking V-belt pulleys actuated by a single belt and idler pulleys. Since the available motor speed is usually about 1750 R. P. M., this speed is reduced by means of V-belt and pulleys to about 900 R. P. M.

The pulley 21 is driven by means of a V-belt 22 from the pulley 23 of motor 20. Pulley 21 has secured thereto a pinion 24 having thirty-five teeth. This pinion meshes with a compound gear 25 comprising concentric gear elements 26 and 27 having thirty-five and twenty teeth, respectively, on shaft 28 (Figures 5 and 15). The twenty tooth pinion 27 of this compound gear 25 meshes with the fifty tooth gear 29 which is fastened by key 30 to a long sleeve 31 on the other end of which is mounted a gear 32 having forty-five teeth.

In other words, the thirty-five tooth pinion 24 which is integral with the pulley 21 rotates on the long sleeve 31 and drives the compound pinion 25 comprising gears 26 and 27, said compound pinion being free to turn on the fixed stud 28 which is secured in the center section of the back gauge.

The forty-five tooth gear 32, therefore, is the constant speed member of the planetary gear train. Also freely rotating on the long sleeve 31 is the adjustable interlocking pulley 33 which interlocks with a similar V-belt cone pulley 34 on the V-belt pulley 21. Also journalled on the long sleeve 31 is the pinion 35 and interlocking V-belt cone pulley 36 with which pinion 35 is integral. The interlocking cone pulley has a mating member 37. Pulleys 33 and 37 are mounted on ball bearing races 38 and 39 on pulley carrier 40 which is slidable on long sleeve 31.

The planetary gear carrier 41 has mounted thereon the two planetary pinion shafts 42 and 43 on which are journalled the compound planetary gears 44 and 45. Pinions 46 on compound gears 44 and 45 each has eighteen teeth and meshes with the constant speed gear 32 which has forty-five teeth; and the planetary pinions 47 on compound gears 44 and 45 each has forty-two teeth and meshes with the pinion 35 on pulley 36 which has twenty-one teeth. The interlocking V-belt cone pulleys 33, 34 drive by means of the V-belt 48, the interlocking pair of cone pulleys 36 and 37.

This V-belt 48 is guided over idler pulleys 49 and 50 which are mounted on studs 51, 52 held in brackets 53, 54. Bracket 54 is mounted on shaft 56 which passes through a long bore of the bracket 53. A spring 57 compressed between the collar 58 of shaft 56 and the top of bracket 53 maintains the V-belt 48 under tension. The belt tightening and guiding bracket 53 is supported by the vertical post 55.

The interlocking V-belt pulleys 37 and 33 have interposed between them the shifting yoke 60 which is an extension on both sides of the central sliding carrier or yoke 40.

The center section of the back gauge has mounted on it a bracket 61 which is provided with a bore for receiving the shaft 62. Shaft 62 protrudes on either end of the bracket 61. On one end of shaft 62 is fastened the short shifting arm 63 and on the other end of the shaft 62 is fastened the long shifting arm 64. These two shifting arms 63 and 64 are slotted at 65, 66 to receive the trunnions 67, 68 of the shifting yoke 60 whereby the effective diameters of the two interlocking sets of V-belt cone pulleys can be changed by shifting the yoke 60 and thereby change the speed of the driven gear 36 while the speed of the driving gear 33 remains constant with the result that the speed of the planetary gear carrier 41 is affected thereby.

As previously mentioned, the stop bars 99, 100 each are provided with ten longitudinal splines 140 in which a series of stop blocks 125 can be fastened at any points required on the two stop bars 99 and 100. A long rectangular bar 70 is fastened between the two brackets 106 and on this rectangular bar is slidably mounted the carriage 71. Carriage 71 is provided on brackets 72 and 73 with two retractable stop fingers; said fingers may be made to project so that they will come in contact with any one of the blocks 125 fastened in the stop bars 99 and 100.

In other words, when the upper stop bar 100 is used, the stop pin or finger 75 which is normally used for contacting the blocks 125 in the lower stop bar 99 is withdrawn and vice versa if the lower stop bar 99 is being used, the stop pin or finger 74 which normally coacts with the blocks 125 in the upper stop bar 100 is withdrawn.

The carriage 71 is also provided with brackets 76 and 77 (Figure 11). These brackets will form a retaining plate for the carriage 71 as it slides on the rectangular flat bar 70. The bracket 76 has a bore for receiving the threaded cable end 78 of cable 79, while the bracket 77 has a bore and a pin 81 for receiving the cable end 80. Cable end 80 has three notches 82 which can be used when the cable 79 has stretched beyond a certain amount and it becomes necessary to take it up after there is insufficient thread left on the cable end 78.

These cable ends 78 and 80 of cable 79 not being in the same plane will not interfere with each other.

The brackets 106 are each provided with lugs 84 for receiving the studs 85 of the cable idler pulleys 86. Near the center of the paper cutting machine and attached to the upper beam casting by vertical shaft 89 are two cable idler pulleys 87 and 88; and immediately behind the clamp of the paper cutting machine an additional idler 90 is mounted on a bracket 91 which is also fastened to the top beam casting of the paper cutting machine.

An additional cable idler pulley 92 is provided on a bracket 93 at the rear of the paper cutting machine table. Bracket 93 also has a large bore 94 (Figure 15) for the bearing for the back gauge driving shaft 95. Shaft 95 extends from the rear of the paper cutter table almost to the clamp of the paper cutting machine and has a long spline 96 over which the long sleeve 31 fits.

In other words, the driving power from the planetary gear carrier 41, the latter having a key 97 which fits into the long spline of the shaft 95, transmits the driving power through the shaft 95 to the V-belt pulley 170 and by means of the V-belt 171 drives a similar pulley 172 on the end of the long lead screw 173 which passes through the collar 174 at the bottom of table 176 and threads in the nut 175 secured to back gauge support 177 for back gauge 178 on a long tongue 179 passing through slot guide 180 (Figure 15) in table 176 to the bottom side of the paper cutting machine table 176 and held to a close running fit by means of the gib 181.

The back gauge support 177 is secured by means of bolts to the back gauge 178 of the paper cutting machine so that when the pulley 172 on screw 173 turns in either direction, the back gauge of the paper cutting machine will move accordingly.

The cable 79 (bottom right portion of Figure 5 as well as Figures 15 and 16) passes through the clamp 190. Clamp 190 is provided with a pin 191 from which one end of the link 192 is suspended. The other end of the link 192 fits over a pin 193 which is carried by the long shifting lever 64. Thus, one side of the cable 79 extends from cable end 78 at the front of the machine over idler 86 on the left side, over idler pulley 88, then idler 90 to rear idler 92, and then to cable clamp 190 on the back gauge assembly.

The other end of the cable which ends at the cable end 80 at the front of the machine extends over the right-hand idler pulley 86 and thence over the idler pulley 87 and from there (Figures 4, 15 and 16) over the idler pulley 194 supported by bracket 195 on hollow post 55 to the idler pulley 196 on the bracket 197, the latter being also mounted on the hollow tube 55. This hollow tube 55 has two drilled holes 197, 197 through which the cable 79 passes when going from idler pulley 194 to idler pulley 196. The cable then enters again the clamp piece 190.

Thus, the complete circuit for cable 79 is from end 78 at the front of the machine to left-hand idler 86, pulleys 88, 90, and 92 to clamp 190 on the back gauge; and from clamp 190, over idlers 196, 194, 87 and right-hand idler 86 back to end 80 at the front of the machine.

When now one of the stop fingers 74 or 75 in the bracket 71 makes contact with one of the stop blocks 125 on either of the shafts 99 or 100, it will stop the cable 79 from further movement. Because the cable 79 comes to rest, the clamp piece 190 will also have come to rest; since clamp 190 is connected by means of the link 192 to pin 190 at the lower extremity of the long shift arm 64, the lower end of arm 64 will also have come to rest.

The motor 20, however, through the drive outlines in connection with Figures 5 and 15 is still driving screw 173 to advance the back gauge. The shift yoke 60 is now brought into operation. The lower pin 193 will be the pivot point for the movement of the shift yoke 60 because the upper end of the shifting arm 64 is fastened to the shaft 62 which is carried in the bracket 61 of the center back gauge section; and shaft 62 is moving forward with the back gauge.

This forward motion of the shaft 62 causing arm 64 to pivot about lower pin 193 and thus moving trunnion 66 of shift yoke 60 forward will shift or disturb the relation between the interlocking V-belt cone pulleys 36—37 and 33—34 from the solid line positions of Figure 5 to the dotted line positions thereof; this will force V-belt 48 to run on a larger diameter of pulleys 36—37 which have been brought together and at the same time will cause the V-belt 48 to run on a smaller diameter of the interlocking cone pulleys 33—34 which have been separated.

The speed of driven gear 36 has now been increased. An increase in speed of gear 36 will result in a decrease in speed of the planetary gear carrier 41. Therefore, continued movement of the shaft 62 to the left will continue to decrease the speed of the planetary gear carrier 41 until finally the back gauge will come to a stop. The back gauge is thus gradually stopped.

The operator will now make a cut operating the knife 145 in any suitable manner. As previously described, the cross head 142 will be reciprocated downwardly and then upwardly and during this upward stroke will index the stop bars 99 and 100 1/10 of a revolution.

When this occurs, the particular block 125 which was now contacted by the stop pin 74 or 75 in carriage 71 will move out of contact with this pin. The cable 79 is now free to move once more. The arm 64 which is released for movement when cable 79 is released by rotation of stop 125 out of the way of fingers 74 or 75 will be urged by the spring 198 to again shift the cone pulleys 37—33 to the right.

Spring 198 around post 199 bears upwardly against collar 200 attached to extension 201 of arm 202, which in turn is an extension of lever 64. Arms 64 and 202 form a bell crank lever secured to shaft 62.

This shift will again decrease the speed of the pinion 36, and such decrease in speed of this pinion will result in an increase of speed of the planetary gear carrier 41 and bring the back gauge gradually to its maximum forward speed until the stop finger 74 or 75 on the carriage 71 will again come in contact with the next block 125 of the stop bars 99 or 100. This will again arrest the motion of the cable and then the continued forward motion of the back gauge will again cause a shifting of the interlocked cone pulleys 37—33 and result in an increase in speed of the pinion 36 to cause a decrease in speed of the planetary gear carrier 41 until finally the planetary gear carrier 41 comes to a dead stop. A stop screw 203 (Figure 16) is provided on the back gauge to abut against the lower end of shift lever 64 at the dead stop position to prevent accidental movement of the back gauge beyond this position.

For the convenience of the operator, an indicating light 204 is provided which will tell him whether the back gauge has stopped at the correct location. For this purpose, two rectangular metal strips 204—205 are mounted on an insulating block 206 and fastened by means of screws to a rib on the center section 177 of the back gauge. A link 207 is pivoted on the pin 193 which is carried on the bottom end of the long shifting lever 64.

On the other extremity of this link 207 is mounted a roller 208. This roller is metallic and has a fiber insulated center mounted on the screw 220. Therefore, whenever the shifting lever 64 has come against the stop screw 203, roller 208 will have made electrical contact across the two rectangular plates 204—205, and these rectangular plates can be placed into an electric circuit with an indicating lamp 204, the roller 208 merely closing the electric circuit so that the indicating lamp will light when the back gauge has stopped at the correct position.

On completion of the series of steps of the back gauge, the motor may be reversed to drive the back gauge back to its initial position. To facilitate this return movement, the stop fingers 74 are beveled as seen in Figure 19 so that they may push back against the springs 215 to clear the stops 210 as they move past.

Figure 20:
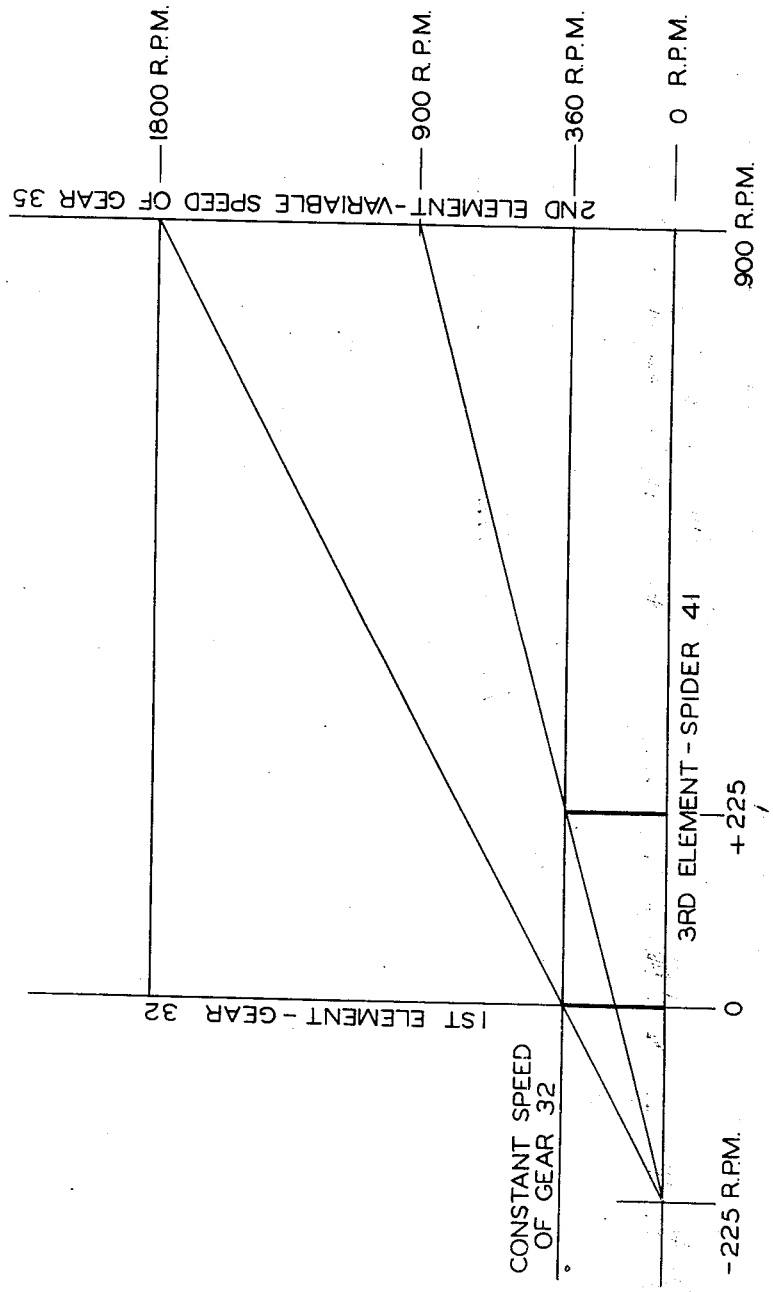
Figure 20 is a graphic illustration of the operation of my invention.

In Figure 20 I have shown graphically the manner in which the combination of the variable speed drive and the gear train results in reduction of speed to zero as the back gauge approaches the pre-set point; the graph illustrating the result of the operation of levers 63—64 (Figure 16) to bring the mechanism of Figures 5 and 15 to a gradual halt.

The speed relation diagram, Figure 20, is constructed as follows:

1. Draw a horizontal line on which will be represented the speed of the third element or spider 41.
2. Draw two perpendicular lines to this horizontal line spaced a suitable distance apart.
3. Mark the intersection of the left perpendicular 0 and that of the right perpendicular 900 R. P. M.
4. On the left perpendicular the constant speed of the first planetary gear element (gear 32) is represented.
5. On the right perpendicular the variable speed of the second planetary gear element (gear 35) is represented and marked 900 R. P. M.
6. Compute the speed and direction of rotation of spider 41 when the gear 32 is held stationary and gear 35 turns 900 R. P. M.

|  | Spider 41 | Gear 32 | Gear 35 |
|---|---|---|---|
| Entire gear set turns | 1 | 1 | 1 |
| Spider 41 held | 0 | −1 | −5 (See note) |
| Gear 32 held | 1 | 0 | −4 |
| or | −¼ | 0 | 1 |
| or ............ R. P. M. | −225 | 0 | +900 |

NOTE: Gear 32 has 45 teeth; gear 35 has 21 teeth; gear 46 has 18 teeth; gear 47 has 48 teeth. $\frac{-45 \times 42}{18 \times 21} = -5$ 7. Mark off on horizontal line, −225 R. P. M. to horizontal scale.
8. Draw a line from −225 R. P. M. on horizontal line to 900 R. P. M. on the right perpendicular line.
9. Draw a horizontal line parallel to first line drawn at a distance 360 R. P. M. to scale of right perpendicular.
10. Draw a line from −225 R. P. M. through the point of intersection of the 360 R. P. M. line of item 9 above with the left perpendicular and note its intersection produced with the right perpendicular.
11. This intersection will be at 1800 R. P. M. on the right perpendicular line, which must be the speed of gear 35 when gear 32 rotates 360 R. P. M. and when the spider 41 stands still.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In apparatus including a gauge, means for advancing the gauge to a plurality of pre-selected successive positions; said means including an operating mechanism; an infinitely variable speed changer for said operating mechanism adapted to vary the output speed thereof from zero to a predetermined maximum; means operable on the speed changer to shift the output speed of the operating mechanism to the maximum on the occurrence of a predetermined condition and means responsive to the movement of the gauge to a predetermined position before a pre-selected position to operate the speed changer to shift the output speed of the operating mechanism gradually from the maximum speed toward zero speed; said last mentioned means bringing the output speed of the operating mechanism to zero speed when the gauge reaches the pre-selected position.

2. In apparatus including a gauge, means for advancing the gauge to a plurality of pre-selected successive positions; a plurality of adjustable stops movable to positions corresponding to said pre-selected positions; said means including an operating mechanim; an infinitely variable speed changer for said operating mechanism adapted to vary the output speed thereof from zero to a predetermined maximum; a member movable with the gauge; a portion of said member being arranged to be halted by each stop in turn; said member being connected to the speed changer and being movable with respect to the gauge to shift the output speed of the operating mechanism between a maximum at one position of said member and zero at another position of said member; said member being positionable at the maximum speed position to cause said gauge to move; a portion of said member being halted by a stop at a predetermined position of the gauge before a pre-selected position; the said member thereafter moving with respect to said gauge to shift the output speed of the operating mechanism gradually from the maximum speed to zero speed between the last-mentioned predetermined position and the pre-selected position.

3. In apparatus including a gauge, means for advancing the gauge to a plurality of pre-selected successive positions; said means including an operating mechanism; an infinitely variable mechanical speed changer for said operating mechanism adapted to vary the output speed thereof from zero to a predetermined maximum; means operable on the speed changer to shift the output speed of the operating mechanism to the maximum on the occurrence of a predetermined condition and means responsive to the movement of the gauge to a predetermined position before a pre-selected position to operate the speed changer to shift the output speed of the operating mechanism gradually from the maximum speed toward zero speed; said last-mentioned means bringing the output speed of the operating mechanism to zero speed when the gauge reaches the pre-selected position.

4. In apparatus including a gauge, means for advancing the gauge to a plurality of pre-selected successive positions; a plurality of adjustable stops movable to positions corresponding to said pre-selected positions; said means including an operating mechanism; an infinitely variable mechanical speed changer for said operating mechanism adapted to vary the output speed thereof from zero to a predetermined maximum; a member movable with the gauge; a portion of said member being arranged to be halted by each stop in turn; said member being connected to the speed changer and being movable with respect to the gauge to shift the output speed of the operating mechanism between a maximum at one position of said member and zero at another position of said member; said member being positionable at the maximum speed position to cause said gauge to move; a portion of said member being halted by a stop at a predetermined position of the gauge before a pre-selected position; the said member thereafter moving with respect to said gauge to shift the output speed of the operating mechanism gradually from the maximum speed to zero speed between the last-mentioned predetermined position and the pre-selected position; means operable to move said stop from halting connection with said member; said member being thereafter movable with respect to the gauge to shift the output speed of the operating mechanism from zero to the maximum.

5. In apparatus including a gauge, means for advancing the gauge to a plurality of pre-selected successive positions; transmission means in said advancing means having an infinitely variable output speed between zero speed and a maximum speed; means for shifting said transmission means toward maximum output speed; and means operable at a predetermined position of the gauge before a pre-selected position of the gauge to shift said transmission means toward zero output speed; said last-mentioned means causing said transmission means to reach zero output speed at said pre-selected position.

6. In apparatus including a gauge, means for advancing the gauge to a plurality of pre-selected successive positions; transmission means in said advancing means having an infinitely variable output speed between zero speed and a maximum speed; means for shifting said transmission means toward maximum output speed; and means operable before the gauge reaches a pre-selected position to shift the transmission output speed toward zero.

7. In apparatus including a gauge, means for advancing the gauge to a plurality of pre-selected successive positions; transmission means in said advancing means having an infinitely variable output speed between zero speed and a maximum speed; means for shifting said transmission means toward maximum output speed; and means operable before the gauge reaches a pre-selected position to shift the transmission output speed toward zero; said transmission output speed reaching zero when the gauge reaches said pre-selected position.

8. In apparatus including a gauge, means for advancing the gauge to a plurality of pre-selected successive positions; transmission means in said advancing means having an infinitely variable output speed between zero speed and a maximum speed; control means for said transmission comprising a rocking lever movable between angular positions corresponding to maximum and zero output speed of said transmission; means actuated by the forward travel of the gauge when it reaches the forward limit of its motion at a pre-selected position to turn the lever to zero output speed of the transmission.

9. In apparatus including a gauge, means for advancing the gauge to a plurality of pre-selected successive positions; transmission means in said advancing means having an infinitely variable output speed between zero speed and a maximum speed; control means for said transmission comprising a rocking lever movable between angular positions corresponding to maximum and zero output speed of said transmission; means actuated by the forward travel of the gauge when it reaches a predetermined position before the forward limit of its motion at a pre-selected position to initiate the movement of the rocking lever toward zero output speed of the transmission.

10. In apparatus including a gauge, means for advancing the gauge to a plurality of pre-selected successive positions; transmission means in said advancing means having an infinitely variable output speed between zero speed and a maximum speed; control means for said transmission comprising a rocking lever movable between angular positions corresponding to maximum and zero output speed of said transmission; means actuated by the forward travel of the gauge when it reaches a predetermined position before the forward limit of its motion at a pre-selected position to initiate the movement of the rocking lever toward zero output speed of the transmission; said rocking lever reaching zero output speed of the transmission when the gauge reaches said pre-selected position.

11. In apparatus including a gauge, means for advancing the gauge to a plurality of pre-selected successive positions; transmission means in said advancing means having an infinitely variable output speed between zero speed and a maximum speed; control means for said transmission comprising a rocking lever movable between angular positions corresponding to maximum and zero output speed of said transmission; means actuated by the forward travel of the gauge when it reaches a predetermined position before the forward limit of its motion at a pre-selected position to initiate the movement of the rocking lever toward zero output speed of the transmission; said rocking lever reaching zero output speed of the transmission when the gauge reaches said pre-selected position; said gauge being brought to a gradually decelerated halt at said pre-selected position.

12. In apparatus including a gauge, means for advancing the gauge to a plurality of pre-selected successive positions; transmission means in said advancing means having an infinitely variable output speed between zero speed and a maximum speed; control means for said transmission comprising a rocking lever movable between angular positions corresponding to maximum and zero output speed of said transmission; means actuated by the forward travel of the gauge when it reaches a predetermined position before the forward limit of its motion at a pre-selected position to initiate the movement of the rocking lever toward zero output speed of the transmission; said gauge being brought to a gradually decelerated halt at said pre-selected position.

13. In a cutting machine including a reciprocating knife and a back-gauge, means for stepping said back-gauge to a plurality of pre-selected successive positions; said means including operating mechanism driving said back-gauge; means responsive to the completion of the movement of the knife to initiate said operating mechanism; a plurality of adjustable stops and a stop engaging member movable with said back-gauge; said operating mechanism including an infinitely variable mechanical speed changer operable to vary the output speed thereof from zero speed to a maximum; means responsive to the engagement of said stop engaging member with one of said stops to operate said speed changer through an infinite series of speed changes to bring the operating mechanism and the back-gauge to a gradual halt.

14. In a cutting machine including a reciprocating knife and a back-gauge, means for stepping said back-gauge to a plurality of pre-selected successive positions; said means including operating mechanism driving said back-gauge; means responsive to the completion of the movement of the knife to initiate said operating mechanism; a plurality of adjustable stops and a stop engaging member movable with said back gauge; said operating mechanism including an infinitely variable speed changer operable to vary the output speed thereof from zero speed to a maximum; means responsive to the engagement of said stop engaging member with one of said stops to operate said speed changer through an infinite series of speed changes to bring the operating mechanism and the back-gauge to a gradual halt.

15. In a cutting machine including a reciprocating knife and a back-gauge, means for stepping said back-gauge to a plurality of pre-selected successive positions; said means including operating mechanism driving said back-gauge; means responsive to the completion of the movement of the knife to initiate said operating mechanism; a plurality of adjustable stops and a stop engaging member movable with said back-gauge; means responsive to the engagement of said stop engaging member with one of said stops to decelerate said operating mechanism and said back gauge through an infinitely variable diminishing speed to a halt.

16. In a cutting machine including a reciprocating knife and a back-gauge, means for stepping said back-gauge to a plurality of pre-selected successive positions; said means including operating mechanism driving said back-gauge; means responsive to the completion of the movement of the knife to initiate said operating mechanism; a plurality of adjustable stops and a stop engaging member movable with said back-gauge; means responsive to the engagement of said stop engaging member with one of said stops to halt said operating mechanism.

17. In a cutting machine including a reciprocating knife and a back-gauge, means for stepping said back-gauge to a plurality of pre-selected successive positions; said means including operating mechanism driving said back-gauge; means responsive to the completion of the movement of the knife to initiate said operating mechanism; a plurality of adjustable stops and a stop engaging member movable with said back-gauge; means responsive to the engagement of said stop engaging member with one of said stops to decelerate said operating mechanism and said back gauge to a halt.

18. In a cutting machine including a reciprocating knife and a back-gauge, means for stepping said back-gauge to a plurality of pre-selected successive positions; said means including operating mechanism driving said back-gauge; said operating mechanism including an infinitely variable speed changer operable to vary the output speed thereof from zero speed to a maximum; said operating mechanism and back-gauge being halted during the operation of the knife; means responsive to the completion of the movement of the knife to vary the speed changer to bring the operating mechanism and the back-guage into movement; a plurality of adjustable stops and a stop engaging member movable in response to movement of said back-gauge; means responsive to the engagement of said stop engaging member with one of said stops to operate said speed changer through an infinite series of speed changes to bring the operating mechanism and the back-gauge to a gradual halt.

19. In a cutting machine including a reciprocating knife and a back-gauge, means for stepping said back-gauge to a plurality of pre-selected successive positions; said means including operating mechanism driving said back-gauge; said operating mechanism including an infinitely variable speed changer operable to vary the output speed thereof from zero speed to a maximum; said back-gauge being halted during operation of the knife; means for varying the speed changer to bring the output speed of the operating mechanism from zero to the maximum to bring the back-gauge into movement; and means responsive to the movement of the back-gauge to a predetermined extent to operate the speed changer through an infinite series of speed changes to bring the output speed of the operating mechanism gradually to zero and to gradually halt the back-gauge at a predetermined position.

20. In a machine of the character described, a back gauge, means for advancing the back gauge step by step, said means comprising a transmission having an infinitely variable speed between a maximum speed and zero speed, a rocking member operatively connected with said transmission having extreme angular positions corresponding with the maximum and zero speed positions of the transmission respectively and having an infinite series of intermediate positions corresponding with intermediate speeds of the transmission, and means actuated by the travel of the back gauge at the forward limit of its motion for turning the rocking member through intermediate positions to the zero position.

21. In apparatus for advancing a gauge (to a plurality of pre-selected successive positions); transmission means having an infinitely variable series of operative positions between a maximum speed and zero speed; control means for shifting said transmission through said variable series of operative positions to zero speed and to maximum speed; said control means being movable with said gauge and being operable in accordance with successive predetermined positions thereof related to said successive pre-selected positions.

22. In apparatus for advancing a gauge; transmission means having an infinitely variable series of operative positions between a maximum speed and zero speed; control means for shifting said transmission through said variable series of operative positions to zero speed and to maximum speed; said control means being movable with said gauge and being operable in accordance with the position of said gauge.

23. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member.

24. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable; said stops being moved successively into the line of movement of said stop engaging member.

25. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar; said bar being movable to bring the stops successively into the line of movement of said stop engaging member.

26. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar; at a plurality of angularly displaced positions around the longitudinal axis of said bar; said bar being movable angularly on its longitudinal axis to bring the stops successively into the line of movement of said stop engaging member.

27. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar and at a plurality of longitudinally displaced positions along said bar; said bar being movable angularly on its longitudinal axis to bring the stops successively into the line of movement of said stop engaging member.

28. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar and at a plurality of longitudinally displaced positions along said bar; said bar being movable angularly on its longitudinal axis to bring the stops successively into the line of movement of said stop engaging member; successive angular displacements of said stops corresponding to successive longitudinal displacements thereof.

29. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar and at a plurality of longitudinally displaced positions along said bar; said bar being movable angularly on its longitudinal axis to bring the stops successively into the line of movement of said stop engaging member; said stops being individually adjustable longitudinally along said bar.

30. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar and at a plurality of longitudinally displaced positions along said bar; said bar being movable angularly on its longitudinal axis to bring the stops successively into the line of movement of said stop engaging member; said stops being individually adjustable longitudinally along said bar; the mounting means for said stops comprising a plurality of substantially longitudinal supports along said bar angularly displaced from each other.

31. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar and at a plurality of longitudinally displaced positions along said bar; said bar being movable angularly on its longitudinal axis to bring the stop successively into the line of movement of said stop engaging member; said stops being individually adjustable longitudinally along said bar; the mounting means for said stops comprising a plurality of substantially longitudinal supports along said bar angularly displaced from each other; said stops being slidable and settable along said longitudinal supports.

32. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar and at a plurality of longitudinally displaced positions along said bar; said bar being movable angularly on its longitudinal axis to bring the stops successively into the line of movement of said stop engaging member; said stops being individually adjustable longitudinally along said bar; the mounting means for said stops comprising a plurality of substantially longitudinal grooves along said bar angularly displaced from each other; said stops being slidable and settable along said longitudinal grooves.

33. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar; said bar being movable angularly on its longitudinal axis to bring the stops successively into the line of movement of said stop engaging member; said stops being individually adjustable longitudinally of said bar.

34. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar; said bar being movable angularly on its longitudinal axis to bring the stops successively into the line of movement of said stop engaging member; said stops being individually adjustable longitudinally of said bar, and counting means operable to bring the bar back to its initial angular position after a predetermined number of angular movements thereof.

35. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable; a plurality of stop bars mounted parallel to the line of movement of said stop engaging member; each stop bar having a plurality of stops mounted thereon; at a plurality of angularly displaced positions around the longitudinal axis of said bar; each bar being movable angularly on its longitudinal axis to bring the stop successively into the line of movement of said stop engaging member.

36. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable; a plurality of stop bars mounted parallel to the line of movement of said stop engaging member; each stop bar having a plurality of stops mounted thereon at a plurality of angularly displaced positions around the longitudinal axis of said bar and at a plurality of longitudinally displaced positions along each bar; each bar being movable angularly on its longitudinal axis to bring the stop successively into the line of movement of said stop engaging member.

37. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable; a plurality of stop bars mounted parallel to the line of movement of said stop engaging member; each stop bar having a plurality of stops mounted thereon at a plurality of angularly displaced positions around the longitudinal axis of said bar and at a plurality of longitudinally displaced positions along each bar; each bar being movable angularly on its longitudinal axis to bring the stop successively into the line of movement of said stop engaging member; the bars being displaceable angularly in sequence to bring successive stops into intercepting relation with said stop engaging member.

38. In apparatus of the character described, a back gauge; means for advancing the back gauge step by step to a plurality of successive preselected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; mean operable after the halting of the back gauge by one stop to remove said stop from intercepting relation with said stop engaging member and to bring the next stop into the path of movement of said stop engaging member; said stop engaging member being linearly movable; a plurality of stop bars mounted parallel to the line of movement of said stop engaging member; each stop bar having a plurality of stops mounted thereon at a plurality of angularly displaced positions around the longitudinal axis of said bar and at a plurality of longitudinally displaced positions along each bar; each bar being movable angularly on its longitudinal axis to bring the stop successively into the line of movement of said stop engaging member; the bars being displaceable angularly in sequence to bring successive stops into intercepting relation with said stop engaging member, and counting means operable to bring the bars back to their initial angular positions after a predetermined number of angular movements thereof.

39. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable; a plurality of stop bars mounted parallel to the line of movement of said stop engaging member; each stop bar having a plurality of stops mounted thereon at a plurality of angularly displaced positions around the longitudinal axis of said bar and at a plurality of longitudinally displaced positions along each bar; each bar being movable angularly on its longitudinal axis to bring the stop successively into the line of movement of said stop engaging member; the bars being displaceable angularly in sequence to bring successive stops into intercepting relation with said stop engaging member, and counting means cooperable with said means operable after the halting of the back gauge to bring the bars back to their initial angular position after a predetermined number of angular movements thereof.

40. In apparatus of the character described, a back gauge; means for advancing the back gauge step by step to a plurality of successive pre-selected positions; a plurality of adjustable stop members individually settable to determine individual pre-selected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable, a stop mounting bar mounted parallel to the line of movement of said stop engaging member; the stops being mounted on said bar at a plurality of angularly displaced positions around the longitudinal axis of said bar; said bar being movable angularly on its longitudinal axis to bring the stops successively into the line of movement of said stop engaging member; said stops being individually adjustable longitudinally of said bar, and counting means operable to bring the bar back to its initial angular position after a predetermined number of angular movements thereof, and counting means cooperable with said means operable after the halting of the back gauge to bring the bar back to its initial angular position after a predetermined number of angular movements thereof.

FREDERICK W. SEYBOLD.

No references cited.

Disclaimer 2,487,031.—*Frederick W. Seybold*, Westfield, N. J. AUTOMATIC BACK GAUGE SPACER. Patent dated Nov. 1, 1949. Disclaimer filed Dec. 20, 1952, by the assignee, *E. P. Lawson Co., Inc.*

Hereby enters this disclaimer to the subject matter of claims 15, 16, 17, 23, and 24 of said patent.

[*Official Gazette January 27, 1953.*]